(12) United States Patent
Kohno et al.

(10) Patent No.: US 7,795,571 B2
(45) Date of Patent: *Sep. 14, 2010

(54) IMAGING APPARATUS AND A DEVICE FOR USE THEREWITH

(75) Inventors: Akiyoshi Kohno, Yokohama (JP); Yoshiaki Kato, Kusatsu (JP); Yuji Matsuda, Takatsuki (JP)

(73) Assignee: Panasonic Corporation, Osaka (JP)

( * ) Notice: Subject to any disclaimer, the term of this patent is extended or adjusted under 35 U.S.C. 154(b) by 605 days.

This patent is subject to a terminal disclaimer.

(21) Appl. No.: 11/889,919

(22) Filed: Aug. 17, 2007

(65) Prior Publication Data

US 2008/0023730 A1 Jan. 31, 2008

Related U.S. Application Data

(62) Division of application No. 11/143,958, filed on Jun. 3, 2005, now Pat. No. 7,268,333.

(30) Foreign Application Priority Data

Jun. 4, 2004 (JP) ............................. 2004-167735

(51) Int. Cl.
*H01L 27/00* (2006.01)
(52) U.S. Cl. ............................. 250/208.1; 250/214 A
(58) Field of Classification Search ............... 250/208.1, 250/214 A; 257/258
See application file for complete search history.

(56) References Cited

U.S. PATENT DOCUMENTS 6,084,232 A * 7/2000 Kimura .................. 250/214 A
7,268,333 B2 * 9/2007 Kohno et al. ............. 250/208.1

FOREIGN PATENT DOCUMENTS

| JP | 56-79039 | 6/1981 |
|---|---|---|
| JP | 04-291581 | 10/1992 |
| JP | 2982353 | 9/1999 |

OTHER PUBLICATIONS

Sona et al.; "New Driving Method of CPD Solid-State Imaging Sensor"; pp. 1-6.
Japanese Office Action issued in corresponding Japanese Patent Application No. JP 2004-167735, dated Nov. 21, 2006.
"Comparison and Selection of Field Effect Transistor and Bi-Polar Transistor" China AVPHILE, 2000.

* cited by examiner

*Primary Examiner*—Georgia Y Epps
*Assistant Examiner*—Tony Ko
(74) *Attorney, Agent, or Firm*—McDermott Will & Emery LLP

(57) ABSTRACT

An imaging apparatus capable of suppressing deterioration of image qualities and output properties is provided having one or more output circuits in series and a buffer circuit 6, and processing luminance signals from photodetectors to output image information, the buffer circuit performing impedance conversion on signals outputted from a final output circuit of the one or more output circuits, the final output circuit being a source follower circuit that has an active element and a current source circuit 5 which is inserted between a source terminal of the active element and a reference voltage terminal, wherein the current source circuit and the buffer circuit 6 are external to a solid-state image sensor 1 having the photodetectors, and a main part of the current source circuit 5 and a main part of the buffer circuit 6 are in a single package.

10 Claims, 7 Drawing Sheets

(a)

(b)

(c)

IMAGING APPARATUS AND A DEVICE FOR USE THEREWITH

RELATED APPLICATIONS

This application is a Divisional of U.S. application Ser. No. 11/143,958, filed Jun. 3, 2005 now U.S. Pat. No. 7,268,333, claiming priority of Japanese Application No. 2004-167735, filed Jun. 4, 2004, the entire contents of each of which are hereby incorporate by reference.

BACKGROUND OF THE INVENTION (1) Field of the Invention

The present invention relates to an imaging apparatus that processes luminance signals outputted form photodetectors so as to output image information, and an output device used in the imaging apparatus. More specifically, the present invention relates to a technique for suppressing deterioration of properties by reducing an adverse effect due to heat in a final output circuit.

(2) Description of the Related Art

In recent years, imaging devices such as home video cameras and digital still cameras has been increasingly popular.

These imaging devices typically employ a solid-state image sensor sequentially outputting signals from photodetectors that re aligned in two dimensional plane, using more than one vertical CCDs and at least one horizontal CCD.

Such a solid-state image sensor is detailed in "New Method of Driving CPD Solid-State Image Sensor" (Institute of Television Engineers of Japan Technical Report, Mar. 16, 2982) by Sone and 6 others from Electronics Research Laboratory of Matsushita Electronics Industry Corporation.

Further, a conventional art relating to heat dissipation for the solid-state image sensor is disclosed in Japanese Patent No. 2982353 (hereinafter referred to as Patent Document 1).

Patent Document 1 teaches that a constant current source unit in a final output circuit of output units is a source follower circuit and external to the solid-state image sensor, thereby reducing a heating value of the solid-state image sensor by half. However, the external constant current source unit still generates heat, and a total amount of heating value does not change. The technique of Patent Document 1 merely diversifies heat sources and does not refer to any other object and effect.

Generally, the photodetectors are positioned at a central part of the solid-state image sensor, and circuits that are not necessary for every photodetector are disposed on a peripheral area around the photodetectors.

Therefore, the output unit with a high heating value is disposed at a part of the peripheral area. When a thickness of a wafer of the solid-state image sensor is thinner than a certain degree, the heat generated at the output unit does not spread over an entire solid-state image sensor. Instead, a temperature rises only at a part of the photodetectors that are in a vicinity of the output unit.

It is a general tendency that an amount of dark current in the photodetectors increases as the temperature becomes higher.

Thus, the rise in temperature at a part of the photodetectors that are in a vicinity of the output unit increases the dark current in these photodetectors. This has an adverse effect on image qualities and makes a resulting image partially white.

Such a phenomenon can be observed when the wafer of the solid-state image sensor is as thin as around 500 μm, and becomes especially notable when the wafer is thinner than about 400 μm.

One of the prevailing approaches taken in order to avoid the above problem is to provide the output unit external to the solid-state image sensor having the photodetectors.

However, this approach has a problem that, when the output unit is external to the solid-state image sensor, output responsiveness decreases because floating capacitance in the wiring increases, and a S/N ratio deteriorates because of an increased amount of noise.

SUMMARY OF THE INVENTION

In view of the above problem, the present invention aims to provide an imaging apparatus and a device that is capable of, when a wafer is made thin, suppressing deterioration of performance and qualities due to a rise in temperature only at a part of photodetectors in vicinity of an output unit, in addition to increase of floating capacitance in the output unit external to the solid-state image sensor.

To achieve the above object, an imaging apparatus according to the present invention has one or more output circuits in series and a buffer circuit, and processing luminance signals form photodetectors to output image information, the buffer circuit performing impedance conversion on signals outputted from a final output circuit of the one or more output circuits, the final output circuit being a source follower circuit that has an active element and a current source which is inserted between a source terminal of the active element and a reference voltage terminal, wherein the current source and the buffer circuit are external to a solid-state image sensor having the photodetectors, and a main part of the current source and a main part of the buffer circuit are in a single package.

To achieve the above object, a device used in an imaging apparatus according to the present invention has one or more output circuits in series and a buffer circuit and processing luminance signals from photodetectors to output image information, the buffer circuit performing impedance conversion on signals outputted from a final output circuit of the one or more output circuits, that final output circuit being a source follower circuit that has an active element and a current source which is inserted between a source terminal of the active element and a reference voltage terminal, wherein the current source and the buffer circuit are external to a solid-state image sensor having the photodetectors, and the device is constitute by a single package including a main part of the current source and a main part of the buffer circuit.

With the above structure, the current source is provided external to the solid-state image sensor having the photodetectors. Therefore, it is possible to suppress deterioration in qualities in the image information due to a rise in temperature only at a part of the photodetectors. Further, because the main parts of the current source and buffer circuit are in the single package, it is possible to shorten a length of wiring, and thus to improve output responsiveness and a S/N ratio.

Further, the above imaging device also may be such that the main part of the current source is constituted by a first active element, and the main part of the buffer circuit is constituted by a second active element.

Further, the above device also may be such that the main part of the current source is constituted by a first active element, and the main part of the buffer circuit is constituted by a second active element.

With the above structure, because more than one active elements are formed in the single package, it is possible to shorten a length of wiring between the active elements.

Further, the above imaging device also may be such that the first and second active elements are formed on a single semiconductor substrate that is external to the solid-state image sensor, the semiconductor substrate being included in the package.

Further, the above device also may be such that the first and second active elements are formed on a single semiconductor substrate that is external to the solid-state image sensor, the semiconductor substrate being included in the package.

With the above structure, because more than one active elements are formed on the single semiconductor substrate, it is possible to shorten a length of wiring between the active elements. Further, it is possible to improve productivity by manufacturing the active elements in a single manufacturing step.

Further, the above imaging device also may be such that the solid-state image sensor is included in the package, and is connected within the package to the semiconductor substrate.

Further, the above device also may be such that the solid-state image sensor is included in the package, and is connected within the package to the semiconductor substrate.

With the above structure, because the semiconductor substrate and solid-state image sensor are included in the single package and connected to each other in the same package, it is possible to shorten a length of wiring between the semiconductor substrate and solid-state image sensor. Further, floating capacitance decreases with the above structure, and therefore it is possible to improve the output responsiveness and the S/N ratio.

Further, the above imaging device also may be such that the first and second active elements are formed on two different semiconductor substrates that are external to the solid-state image sensor, the semiconductor substrates being included in the package and connected to each other within the package.

Further, the above device also may be such that the first and second active elements are formed on two different semiconductor substrates that are external to the solid-state image sensor, the semiconductor substrates being included in the package and connected to each other within the package.

With the above structure, because more than one active elements are formed on the two semiconductor substrates, and the two semiconductor substrates are connected to each other within the package it is possible to shorten a length of wiring between the active elements.

Further, the above imaging device also may be such that the solid-state image sensor is included in the package, and is connected within the package to at least one of the semiconductor substrates.

Further, the above device also may be such that the solid-state image sensor is included in the package, and is connected within the package to at least one of the semiconductor substrates.

With the above structure, the two semiconductor substrates and solid-state image sensor are included in the single package and the solid-state image sensor is connected to at least one of the two semiconductor substrates within the same package, it is possible to shorten a length of wiring between the solid-state image sensor and the semiconductor substrate to which the solid-sate image sensor is connected. Further, the floating capacitance decreases with the above structure, and therefore it is possible to improve the output responsiveness and the S/N ratio.

Further, the above imaging device also may be such that the current source includes: a resistive divider circuit operable to perform resistive division on a predetermined constant voltage, and output a divided voltage; a current source buffer circuit operable to lower an output impedance of the resistive divider circuit; and a common emitter transistor having a base electrode and a collector electrode, the base electrode being applied with a voltage outputted from the current source buffer circuit, and the collector electrode being connected to an output line of the solid-sate image sensor, and the common emitter transistor constitutes the main part of the current source.

With the above structure, because the output impedance of the resistive divider circuit is lowered by the current source buffer circuit, it is possible to control a variation in voltages at the base electrode, and therefore an output gain in the source follower circuit does not decrease.

Further, the above imaging device also may be such that the common emitter transistor is constituted by an NPN transistor, the current source buffer circuit includes an NPN transistor having a base electrode to which the divided voltage is applied, the second active element is constituted by an NPN transistor, and the three NPN transistors are formed on a single semiconductor substrate that is external to the solid-state image sensor, the semiconductor substrate being included in the package.

With the above structure, because the three transistors constituted by the NPN transistors are formed in the single package, it is possible to manufacture the three transistors in the single manufacturing step, and thus to reduce production cost.

Further, the above imaging device also may be such that the common emitter transistor is constituted by an NPN transistor, the current source buffer circuit includes an NPN transistor having a base electrode to which the divided voltage is applied, the second active element is constituted by a PNP transistor, and the two NPN transistors and the PNP transistor are formed on a single semiconductor substrate that is external to the solid-state image sensor, the semiconductor substrate being included in the package.

With the above structure, because the three transistors are formed in the single package and the buffer circuit is constituted by the PNP transistor, the output responsiveness does not depend on an amount of current and it is possible to improve a falling slew rate without increasing an emitter current more than necessary. It is also possible to obtain excellent output responsiveness in comparison with a case employing the NPN transistor, since the output responsiveness of a CCD depends largely on a rising response characteristic.

Further, the above imaging device also may be such that the common emitter transistor is constituted by an NPN transistor, the current source buffer circuit includes a PNP Transistor and the NPN transistor and the PNP transistor constitute the main part of the current source.

With the above structure, it is possible to suppress the variation in properties by a temperature change, because the two different types of transistors negate the effects of the temperature change each other.

Further, the above imaging device also may be such that the current source includes a junction field-effect transistor having a gate electrode, a source electrode, and a drain electrode, the gate electrode and source electrode being grounded, the drain electrode being connected to an output line of the solid-state image sensor, and the junction field-effect transistor constitutes the main part of the current source.

With the above structure, it is possible to reduce the number of necessary components, and thus to suppress the decrease in the output gain of the source follower circuit, because employing the J-FET makes the bias resistive divider circuit unnecessary.

Further, the above imaging device also may be such that the source electrode is grounded via a source resistance. As used herein, the term "resistance" may include one or more resistors.

With the above structure, it is possible to suppress the variation in drain current by the temperature change.

Further, the above imaging device also may be such that the source resistance is set at a value so that a relation between a gate-source voltage and a drain current is unsusceptible to temperature change.

With the above structure, it is possible to set an appropriate resistive value and to suppress the variation in properties by a temperature change.

Further, the above imaging device also may be such that a rated current for the first and second active elements is in a range of 1 mA to 20 mA, inclusive.

With the above structure, the rated current of each active element is set to be in the range of 1 mA to 20 mA, inclusive, which is smaller than the rated current of common transistors exceeds 50 mA to 100 mA, and thus it is possible to improve other characteristics of each active element, such as making a parasitic capacitance between the base and collector small.

BRIEF DESCRIPTION OF THE DRAWINGS

These and the other objects, advantages and feature of the invention will become apparent from the following description thereof taken in conjunction with the accompanying drawings which illustrate a specific embodiment of the invention.

In the drawings.

DESCRIPTION OF THE PREFERRED EMBODIMENTS

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

First Embodiment

[Outline]

An imaging system of a first embodiment according to the present invention is such that a current source of a source follower circuit that is a final output circuit of an output unit is external to a solid-state image sensor having photodetectors, in order to suppress deterioration of qualities in image information due to a rise in temperature only at a part of the photodetectors in vicinity of the output unit, and also such that the current source and a final buffer circuit are formed in a single package, in order to suppress deterioration of a S/N ratio due to an increase of floating capacitance of the current source external to the solid-state image sensor.

[Structure]

Figure 1:
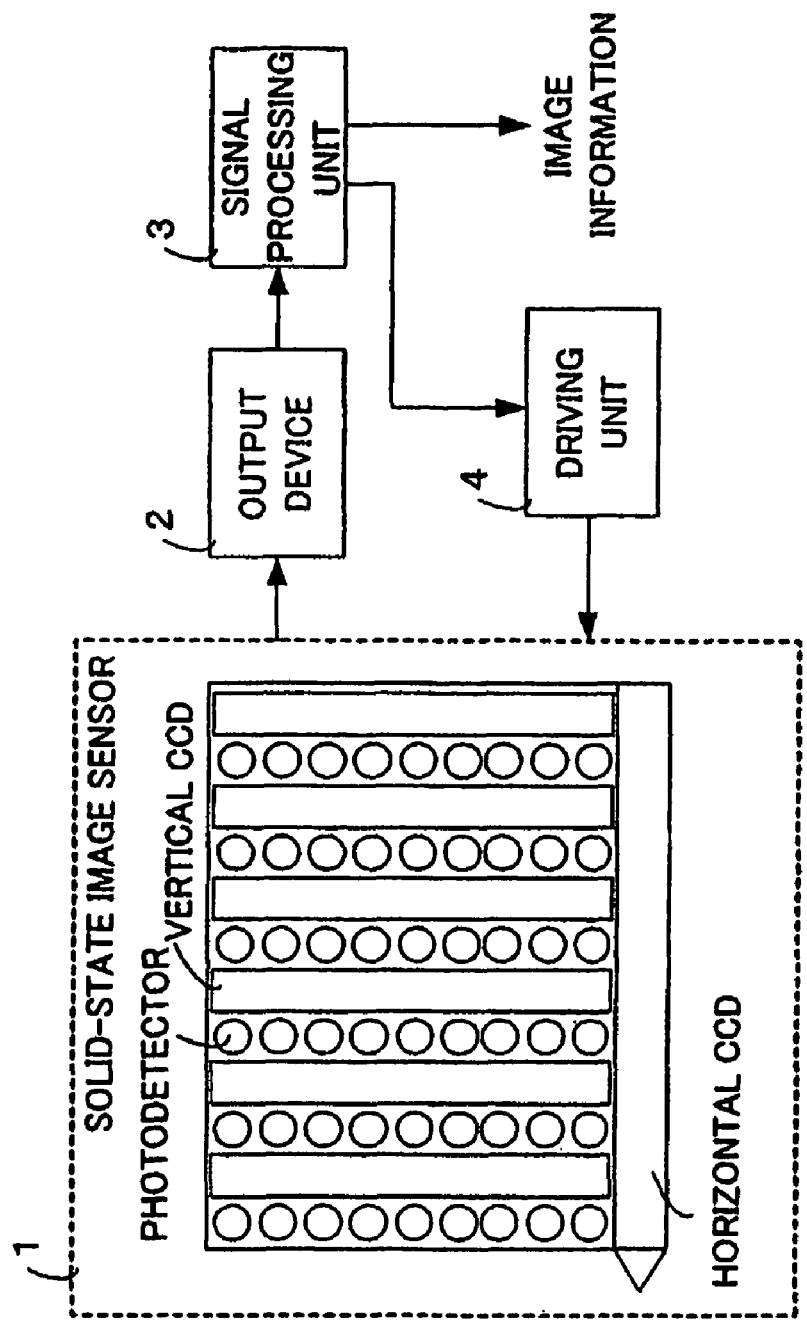
FIG. 1 schematically illustrates a structure of an imaging system of a first embodiment according to the present invention.

FIG. 1 schematically illustrates a structure of the imaging system of the first embodiment according to the present invention.

The imaging system of the first embodiment is incorporated in such imaging apparatuses as video cameras and digital still cameras. With this imaging system, image information is outputted after photoelectrically converting a target image focused by a lens. As shown in FIG. 1, the imaging system includes a solid-state image sensor 1, an output device 2, the signal processing unit 3, and the driving unit 4.

The solid-state image sensor 1 is a semiconductor device driven by the driving unit 4. In the solid-state image sensor 1, a subject image focused by a lens (not depicted in the drawings) is projected to photodetectors aligned in two dimensionally, and luminance signals generated by photoelectric conversion in the respective photodetectors are outputted to the output device 2 in a predetermined order using a plurality of vertical CCDs and a single horizontal CCD. The structure of the solid-state image sensor 1 is similar to a conventional solid-state image sensor in which a final output circuit of an output unit is a source follower circuit, other than that a constant current source unit of the source follower circuit is removed. The source follower circuit has an active element and a current source that is inserted between a source terminal of the active element and a reference voltage terminal.

Note that although examples explained in the specification employ a single horizontal CCD, more that one horizontal CCD may be employed in the solid-state image sensor.

The output device 2 is a single semiconductor device that is connected between the solid-state image sensor 1 and signal processing unit 3, and a circuit for performing necessary conversion on the outputted signals from the solid-state image sensor 1 so as to be outputted to the signal processing unit 3 are formed in a single package.

Note that the imaging system requires the output device 2 of an equal number to the horizontal CCD. Therefore, if there are one or more horizontal CCDs, one or more output devices 2 are also provided.

The signal processing unit 3 instructs the driving unit 4 to drive, and output image information after processing the luminance signals outputted from the output device 2.

The driving unit 4 drives the solid-state image sensor 1 based on the instruction given by the signal processing unit 3.

Figure 2:
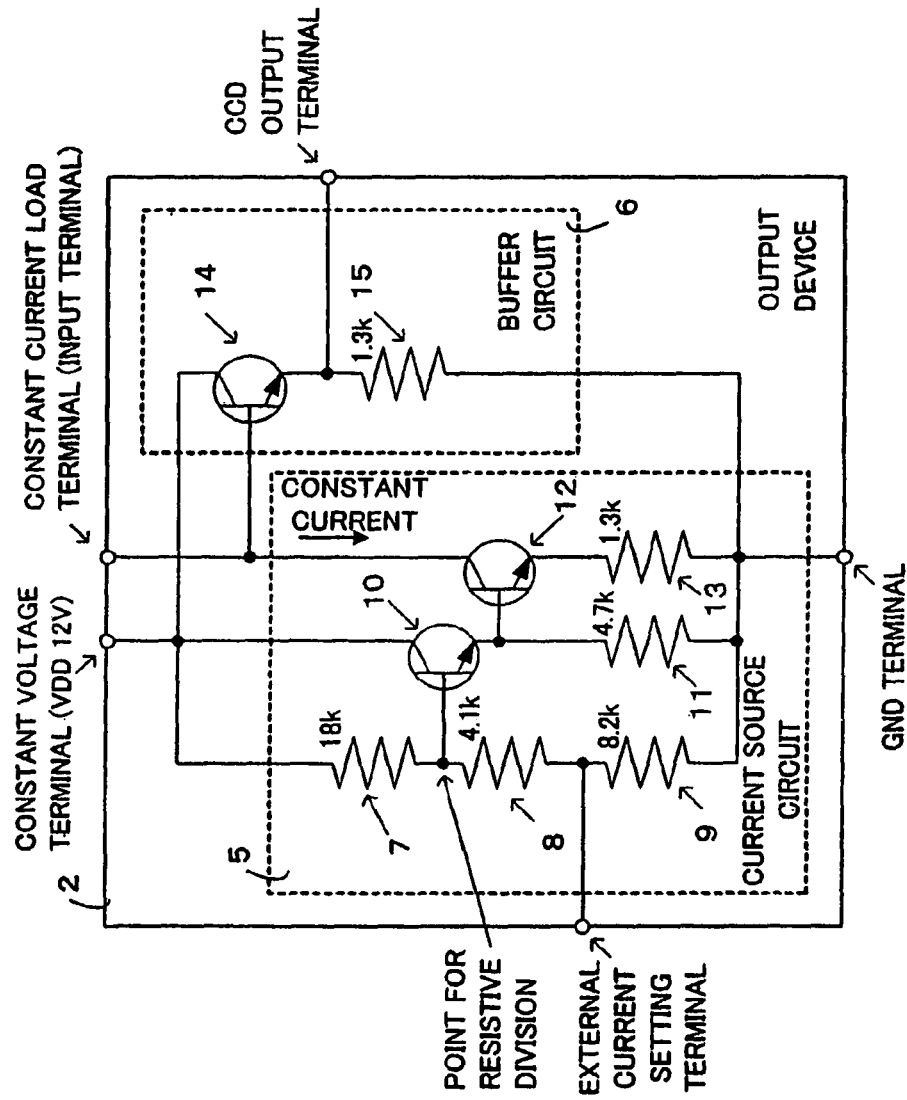
FIG. 2 illustrates circuits in a output device 2 in detail.

FIG. 2 details circuits in the output device 1.

As shown in FIG. 2, the output device 2 includes a current source circuit 5 and a final buffer circuit 6.

The current source circuit 5 corresponds to the constant current source unit provided to the conventional solid-state image sensor and includes, as shown in FIG. 2, a resistance 7, a resistance 8, a resistance 9, a buffer transistor 10, a resistance 11, a common emitter transistor 12, and a resistance 13. The current source circuit 5 constitutes the source follower circuit, along with remaining elements in the final output circuit in the output unit of the solid-state image sensor 1.

The final buffer circuit 6 performs impedance conversion on an output signal from the solid-state image sensor 1 through the current source circuit 5, and then outputs image information. The final buffer circuit 6 includes a buffer transistor 14 and a resistance 15.

The resistances 7, 8, and 9 constitute a resistive divider circuit, and split a predetermined constant voltage by resistive division. A split voltage is outputted through a split point. It is possible to set a current value by grounding, via any resistance, an external current setting terminal.

Here, the predetermined constant voltage is VDD=12 V, the resistance 7 is 18 kΩ and connected between the VDD and split point, the resistance 8 is 4.1 kΩ and connected between the split point and external current setting terminal, and the resistance 9 is 8.2 kΩ and connected between the external current setting terminal and GND.

The buffer transistor 10 is constituted by an NPN transistor in which the split voltage is applied to a base electrode, the collector electrode is connected to the predetermined constant voltage, and an emitter electrode is connected to a base terminal of the common emitter transistor 12 as well as to GND via the resistance 11. The buffer transistor 10 lowers the output impedance of the resistive divider circuit, in order to suppress deterioration of output properties caused by a parasitic capacitance between the base and collector in the transistor.

The common emitter transistor 12 is constituted by an NPN transistor in which the emitter electrode of the buffer transistor 10 is connected to the base electrode, the collector electrode is connected to an output wire of the solid-state image sensor 1, and the emitter electrode is grounded via the resistance 13.

Here the current between the collector and emitter of the common emitter transistor 12 is only about 1 mA to 10 mA. Accordingly, the rated current of around 10 mA at max is sufficient, even with consideration of a high-frequency drive and a high-capacity load. Thus, it is desirable to use small-scale transistors with a rated current I a range of 1 mA to 20 mA, and having an excellent frequency characteristic such as a small parasitic capacitance between the base and collector because of the small rated current. Further, because a rated current for transistors commonly used is around 20 mA to 100 mA, which is too large for a circuit of the common emitter transistor 12, it is preferable to manufacture the small-scale transistors designed for the common emitter transistor 12.

The current between the collector and emitter of the buffer transistor 10 is only about 1 mA to 10 mA. Thus, it is possible to utilize the same type of small-scale transistors used for the common emitter transistor 12.

In addition, the resistance 11 here is 4.7 kΩ, and the resistance 13 here is 1.3 kΩ.

The buffer transistor 14 is constituted by an NPN transistor in which the output signal from the solid-state image sensor 1 is applied to the base electrode, the collector electrode is connected to a predetermined potential, and the emitter electrode is grounded via the resistance 15. Here, the current between the collector and emitter of the buffer transistor 14 is only about 1 mA to 10 mA. Thus, it is possible to utilize the same type of small-scale transistors used for the common emitter transistor 12.

The package may include a single semiconductor substrate on which all the components of the output device 2 are formed. The package may also include the single semiconductor substrate on which a part of the components are formed, and the remaining components. An example of such a package is that the single semiconductor substrate o which active elements such as the buffer transistor 10, common emitter transistor 12, and buffer transistor 14 are formed, and the remaining components not on the substrate are included in the package. Further each active element may be formed on two or three separate semiconductor substrates, and the package may include the two or three semiconductor substrates and the remaining components. An example of such a package is that the buffer transistor 10 is formed on a first semiconductor substrate, the common emitter transistor 12 and buffer transistor 14 are formed on a second semiconductor substrate, and the package includes the first and second semiconductor substrates and the remaining components. Another example is such that the buffer transistor 10 is formed on a first semiconductor substrate, the common emitter transistor 12 is formed on a second semiconductor substrate, an the buffer transistor 14 is formed on a third semiconductor substrate, and the package includes the first, second, and third semiconductor substrates of and the remaining components.

[Conclusion]

As described above, in the imaging system of the first embodiment according to the present invention, the current source of the source follower circuit that is the final output circuit of the output unit is provided external to the solid-state image sensor having the photodetectors. By this, it is possible to suppress deterioration of qualities of the image information caused by temperature rise only around the photodetectors in vicinity of the output unit, which occurs when the wafer is thinner than around 500 μm. Further, a length of wiring can be shorter by forming at least a main part of the current source and a main part of the final buffer circuit in the single package, and thus it is possible to reduce the floating capacitance and improve the S/N ratio. Moreover, because the buffer circuit for lowering the output impedance of the resistive divider circuit is included in the current source, it is possible to improve an output gain of the source follower circuit by suppressing a variation in voltage of the base electrode that is dependent upon signal frequency of the output signal.

Second Embodiment

[Outline]

The second embodiment according to the present invention details an imaging system including a PNP transistor as a buffer transistor, instead of the NPN transistor as the buffer transistor 10 of the current source circuit 5 in the first embodiment, in order to suppress the variation in properties by a temperature change.

[Structure]

The imaging system according to second embodiment includes an output device 20 instead of the output device 2 of the imaging system of the first embodiment. The same reference numbers are assigned to the components that are included in both of the first and second embodiments, and these components are not explained here.

The imaging system according to the second embodiment includes the solid-state image sensor 1, output device 20, signal processing unit 3, and driving unit 4.

Figure 3:
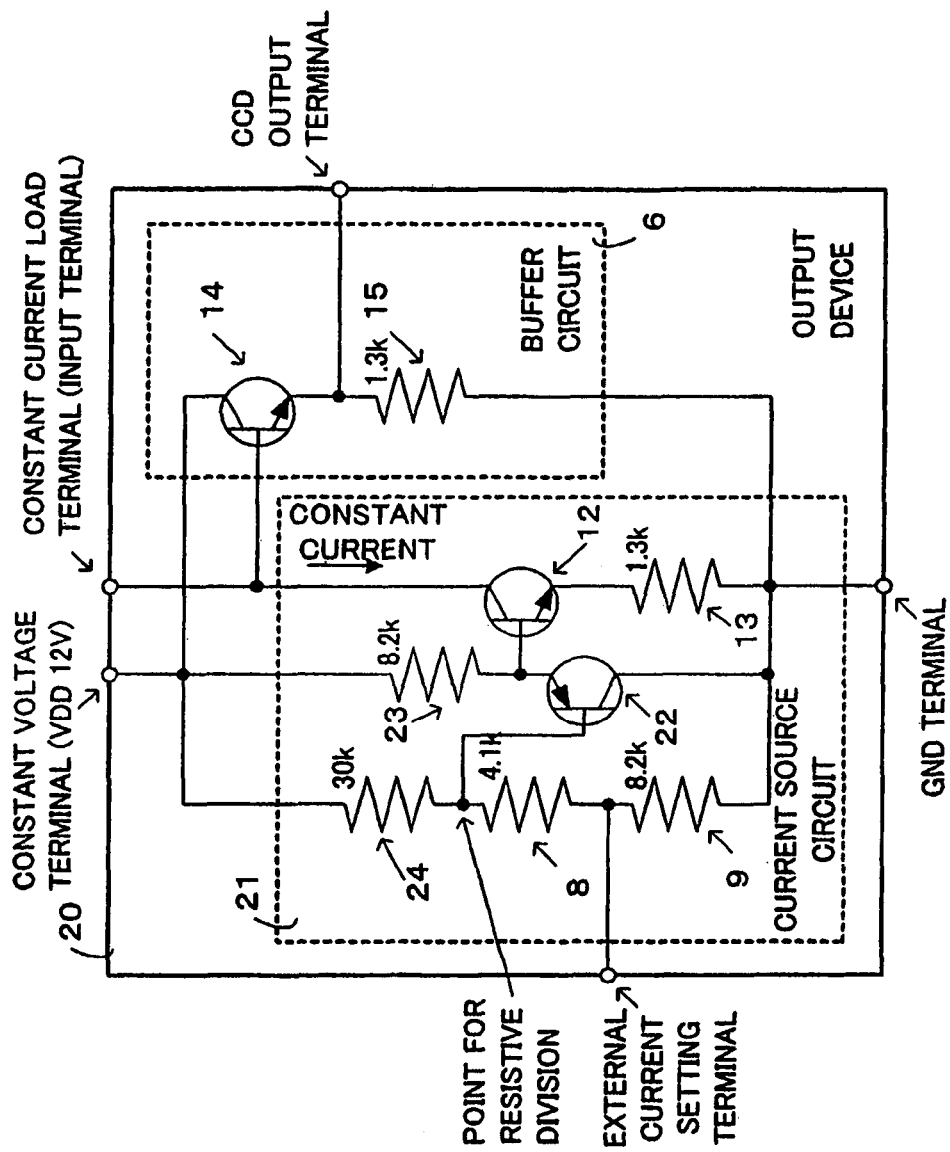
FIG. 3 illustrates circuits in an output device 20 in detail.

FIG. 3 illustrates a circuit of the output device 20 in detail.

As shown in FIG. 3, the output device 20 includes a current source circuit 21 and the final buffer circuit 6.

The current source circuit 21 is an electrical circuit that corresponds to the constant current source unit included in the conventional solid-state image sensor. As shown in FIG. 3, the current source circuit 21 includes a resistance 24, the resistance 8, the resistance 9, a buffer transistor 22, a resistance 23, the common emitter transistor 12, and the resistance 13. The current source circuit 21 and remaining elements in the final output circuit in the output unit included in the solid-state image sensor 1 constitute a source follower circuit. The resistance 24 here is set to 30 kΩ.

The buffer transistor 22 is constitute by a PNP transistor in which the split voltage is applied to the base electrode, the collector electrode is connected to GND, and the emitter electrode is connected to a base terminal of the common emitter transistor 12 as well as to the predetermined constant voltage via the resistance 23. The buffer transistor 22 is a buffer circuit for lowering the output impedance of the resistive divider circuit, in order to suppress deterioration of output properties caused by the parasitic capacitance between the base and collector. Like the case of the buffer transistor 10, it is preferable to manufacture small-scale transistors with a rated current in a range of 1 mA and 20 mA that are designed for the buffer transistor 22.

The resistance 23 here is set to 8.2 kΩ.

The package may include a single semiconductor substrate on which all the components of the output device 20 are formed. The package may also include the single semiconductor substrate on which a part of the components are formed, and the remaining components. An example of such a package is that the single semiconductor substrate on which active elements such as the buffer transistor 22, common emitter transistor 12, and buffer transistor 14 are formed, and the remaining components are included in the package. Further, each active element may be formed on two or three separate semiconductor substrates, and the package may include the two or three semiconductor substrates and the remaining components. An example of such a package is that the buffer transistor 22 is formed on a first semiconductor substrate, the common emitter transistor 12 and buffer transistor 14 are formed on a second semiconductor substrate, and the package includes the first and second semiconductor substrates and the remaining components. Another example is such that the buffer transistor 22 is formed on a first semiconductor substrate, the common emitter transistor 12 is formed on a second semiconductor substrate, and the buffer transistor 14 is formed on a third semiconductor substrate, and the package includes the first, second, and third semiconductor substrates and the remaining components.

[Conclusion]

As described above, in the imaging system of the second embodiment according to the present invention, the buffer transistor included in the current source circuit is the PNP transistor instead of the NPN transistor of the first embodiment. With this change, the imaging system of the second embodiment is less advantageous, in terms of the production cost, than the imaging system of the first embodiment in which all the transistors are of the same type and manufacturing steps are integrated. However, other than the production cost, the imaging system of the second embodiment has the same effects as the imaging system of the first embodiment. Moreover, the imaging system of the second embodiment has an especially advantageous effect in suppressing the variation in properties due to the temperature change because the different types of transistors negate the effects of the temperature change each other.

Third Embodiment

[Outline]

An imaging system of a third embodiment according to the present invention, similar to the first embodiment, is such that the current source of the source follower circuit that is the final output circuit of the output unit is external to the solid-state image sensor having the photodetectors, in order to suppress deterioration of qualities in the image information due to temperature rise only at a part of the photodetectors in vicinity of the output unit, and also such that the current source and the final buffer circuit are formed in the single package, in order to suppress deterioration of the S/N ratio due to the increase of floating capacitance of the current source external to the solid-state image sensor. The difference of the third embodiment from the first embodiment lies in a structure of a circuit in the current source.

[Structure]

The imaging system according to the third embodiment includes an output device 30 instead of the output device 2 of the imaging system of the first embodiment. The same reference numbers are assigned to the components that are included in both of the first and third embodiments, and these components are not explained here.

The imaging system according to the third embodiment includes the solid-state image sensor 1, output device 30, signal processing unit 3, and driving unit 4.

Figure 4:
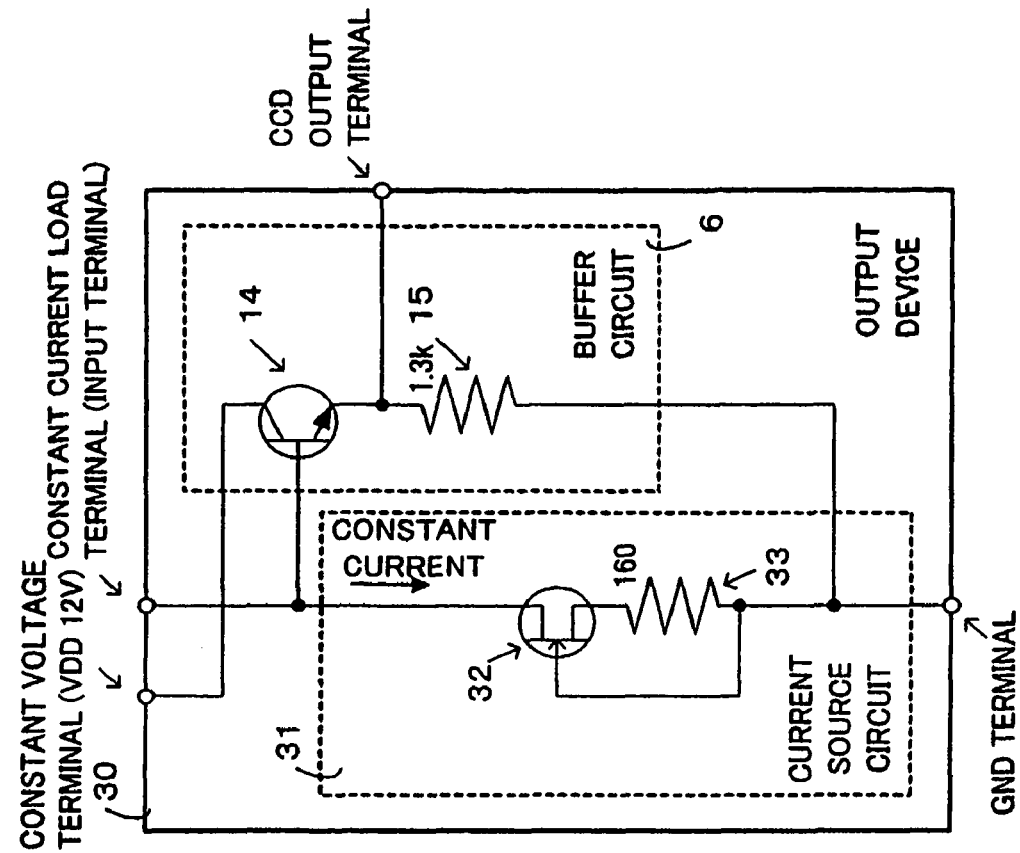
FIG. 4 illustrates circuits in an output device 30 in detail.

FIG. 4 illustrates a circuit of the output device 30 in detail.

As shown in FIG. 4, the output device 30 includes a current source circuit 31 and the final buffer circuit 6.

The current source circuit 31 is an electrical circuit that corresponds to the constant current source unit included in the conventional solid-state image sensor. As shown in FIG. 4, the current source circuit 21 includes a junction field-effect transistor (J-FET) 32 and a source resistance 33. The current source circuit 31 and remaining elements in the final output circuit in the output unit included in the solid-state image sensor 1 constitute a source follower circuit.

The J-FET 32 is a small-signal J-FET in which the base electrode is grounded, a source electrode is grounded via the source resistance 33, and a drain electrode is connected to an output line of the solid-state image sensor 1. Because a current between the drain and source of the J-FET 32 is only about 3 mA, a small-signal J-FET with a drain current about 3 mA is used here.

Note that a device or a circuit having equivalent properties to the small-signal J-FET may also be used instead of the small-signal J-FET. Examples of such a device or a circuit include a current regulative diode.

Further, although the source resistance 33 is not always necessary, providing the source resistance 33 is advantageous because the variation in the drain current can be suppressed by a gate-source voltage generated by the source resistance 33. The rated current of the J-FET 32 here is set larger than the necessary current value, and the source resistance that would set the current to the necessary current value is inserted between the gate and source.

The source resistance 33 here is set to 160 Ω.

Figure 5:
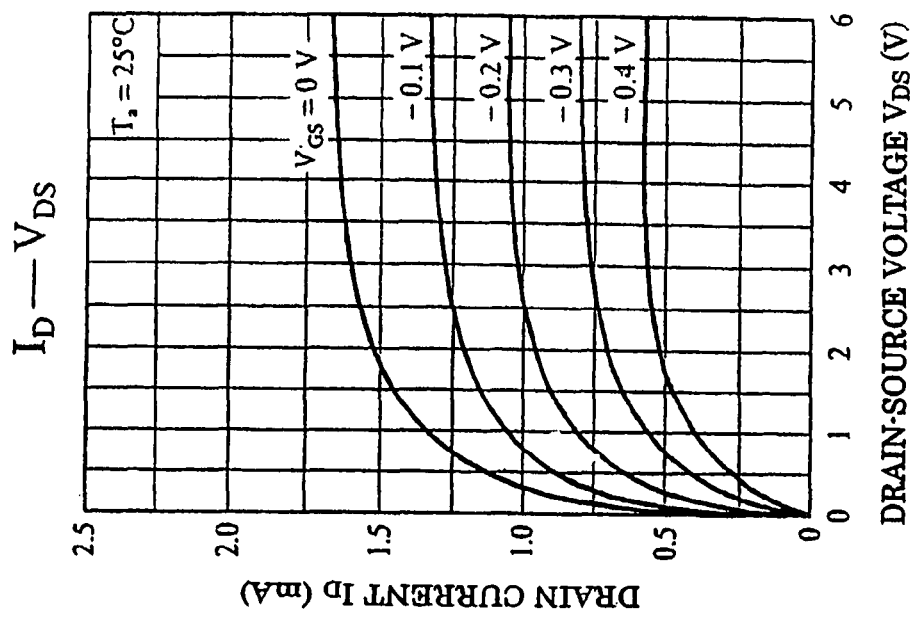
FIG. 5 is a graph showing a relation between a drain-source voltage Vds and a drain current Id for different gate-source voltage Vgs and a drain current ID for different temperature Ta in a small-signal junction field-effect transistor.

FIG. 5 is a graph showing a relation between a drain-source voltage Vds and a drain current Id for a different gate-source voltage Vgs (0V, −0.1V, −0.2V, −0.3V, and −0.4V) of a small-signal junction field-effect transistor (2SK1103).

As shown in FIG. 5, when the gate-source voltage Vgs is −0.4 V or above, and the drain-source voltage Vds is 3 V or above, the drain current is almost constant. When a potential difference between the gate and source is greater, the drain current Id can be saturate with a lower drain-source voltage Vds. In addition, with a self-bias effect, it is possible to suppress the variation of the current between individuals.

Further, it is possible to suppress the variation in properties due to the temperature change by setting the source resistance 33 at an appropriate value.

Figure 6:
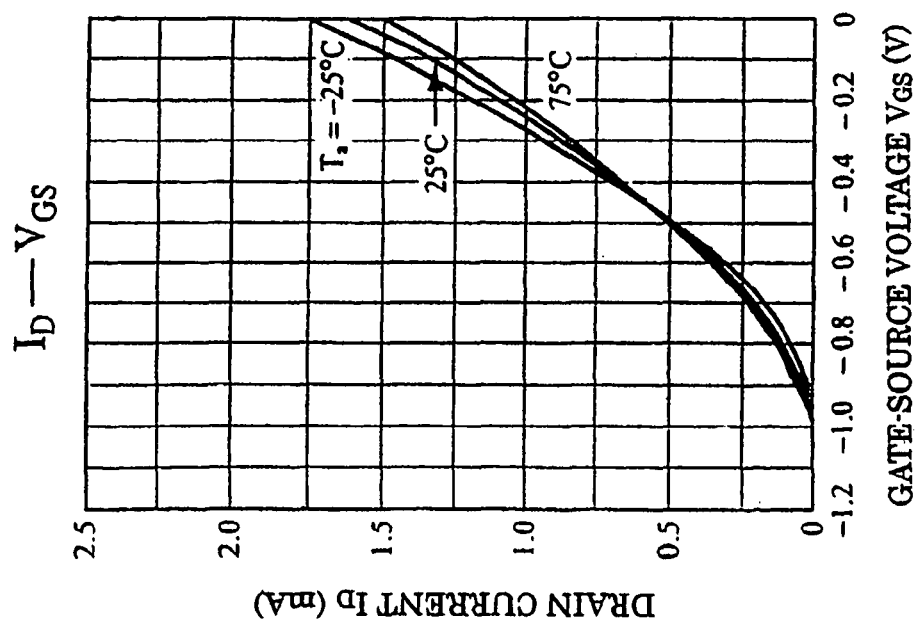
FIG. 6 is a graph showing a relation between a gate-source voltage Vgs and a drain current Id for different temperature Ta in a small-signal junction field-effect transistor.

FIG. 6 is a graph showing a relation between the gate-source voltage Vgs and the drain current Id for different temperature Ta (−25° C., 25° C., and 75° C.) in the small-signal junction field-effect transistor (2SK1103).

As shown in FIG. 6, when the gate-source voltage Vgs is equal to −0.45 V, the drain current is almost constant at any temperature.

Accordingly, it is possible to suppress the variation in properties due to the temperature change by setting the source resistance 33 at a value where the relation between the gate-source voltage and drain current is unsusceptible to the temperature change.

For example, with the small-signal J-FET, the source resistance 33 is set so that the gate-source voltage Vgs is equal to −0.45 V, thereby suppressing the variation in properties due to the temperature change.

The package may include a single semiconductor substrate on which all the components of the output device 30 are formed. The package may also include the single semiconductor substrate on which a part of the components are formed, and the remaining components. An example of such a package is that the single semiconductor substrate on which active elements such as the J-FET 32 and buffer transistor 14 are formed, and the remaining components are included in the package. Further, each active element may be formed on two separate semiconductor substrates, and the package may include the two semiconductor substrates and the remaining components. An example of such a package is that the J-FET 32 is formed on a first semiconductor substrate, and the buffer transistor 14 is formed on a second semiconductor substrate, and the package includes the first and second semiconductor substrates and the remaining components.

[Conclusion]

As described above, in the imaging system of the third embodiment according to the present invention, the current source of the source follower circuit that is the final output circuit of the output unit is provided external to the solid-state image sensor having the photodetectors. By this, it is possible to suppress deterioration of qualities of the image information due to the temperature rise only around the photodetectors in vicinity of the output unit, which is caused when the wafer is thinner than around 500 μm. Further a length of wiring can be shorter by forming at least a main part of the current source and a main part of the final buffer circuit in the single package, and thus it is possible to reduce the floating capacitance and improve the S/N ratio. Moreover, by constituting the current source by the J-FET, a bias resistive divider circuit for setting the current becomes unnecessary, and the number of the necessary components can be reduced. This improves the output gain of the source follower by circuit.

Further, by using the source resistance at an appropriate value, it is possible to stabilize the drain current, suppress the variation between individuals, and thereby suppressing the variation in properties due to the temperature change.

MODIFIED EXAMPLE 1

[Outline]

In a modified example 1 of the present invention, at least a part of the current source and a part of the final buffer circuit are included in the single package, unlike the first to third embodiments in which all of the current source circuit and final buffer circuit are included in the single package.

[Structure]

In the first embodiment according to the present invention, the current source circuit 5 and final buffer circuit 6 are both included in the single package. In the second embodiment according to the present invention, the current source circuit 21 and final buffer circuit 6 are both included in the single package. In the third embodiment according to the present invention, the current source circuit 31 and final buffer circuit 6 are both included in the single package. However, it is not always necessary to these components be included in the single package.

The following describes the modified example 1 of the present invention, where a part of the current source circuit and a part of the final buffer circuit that are external to the solid-state image sensor are included in the single package.

The modified example 1 corresponding to the first embodiment is such that a main part of the current source circuit 5 and a main part of the final buffer circuit 6 are included in the package, and the remaining components are formed on a printed-circuit board external to the package. For example, the buffer transistor 10, common emitter transistor 12, and buffer transistor 14 as active elements are formed on the single semiconductor substrate, and the semiconductor substrate is included in the package. Another example is such that each active element is formed on two or three semiconductor substrates, and two out of the two semiconductor substrates, or tow or three out of the three semiconductor substrates are included in the package.

The modified example 1 corresponding to the second embodiment is such that a main part of the current source circuit 5 and a main part of the final buffer circuit 6 are included in the package, and the remaining components are formed on the printed-circuit board external to the package. For example, the buffer transistor 22, common emitter transistor 12, and buffer transistor 14 as active elements are formed on the single semiconductor substrate, and the semiconductor substrate is included in the package. Another example is such that each active element is formed on two or three semiconductor substrates, and two out of the two semiconductor substrates, or two or three out of the three semiconductor substrates are included in the package.

The modified example 1 corresponding to the third embodiment is such that a main part of the current source circuit 5 and a main part of the final buffer circuit 6 are included in the package, and the remaining components are formed on the printed-circuit board external to the package. For example, the J-FET 32 and buffer transistor 14 as active elements are formed on the single semiconductor substrate, and the semiconductor substrate is included in the package. Another example is such that each active element is formed on two semiconductor substrates, and the two semiconductor substrates are included in the package.

When more than one active element is formed on the single semiconductor substrate, the active elements may be connected to each other on the semiconductor substrate, and the resistances may be formed on the semiconductor substrate by etching.

Moreover, when a plurality of semiconductor substrates are included in the package, the semiconductor substrates may be connected by wire bonding using wires of gold or aluminum.

The same reference numbers are assigned to the components that are included in both of the first and third embodiments, and these components are not explained here.

Figure 7:
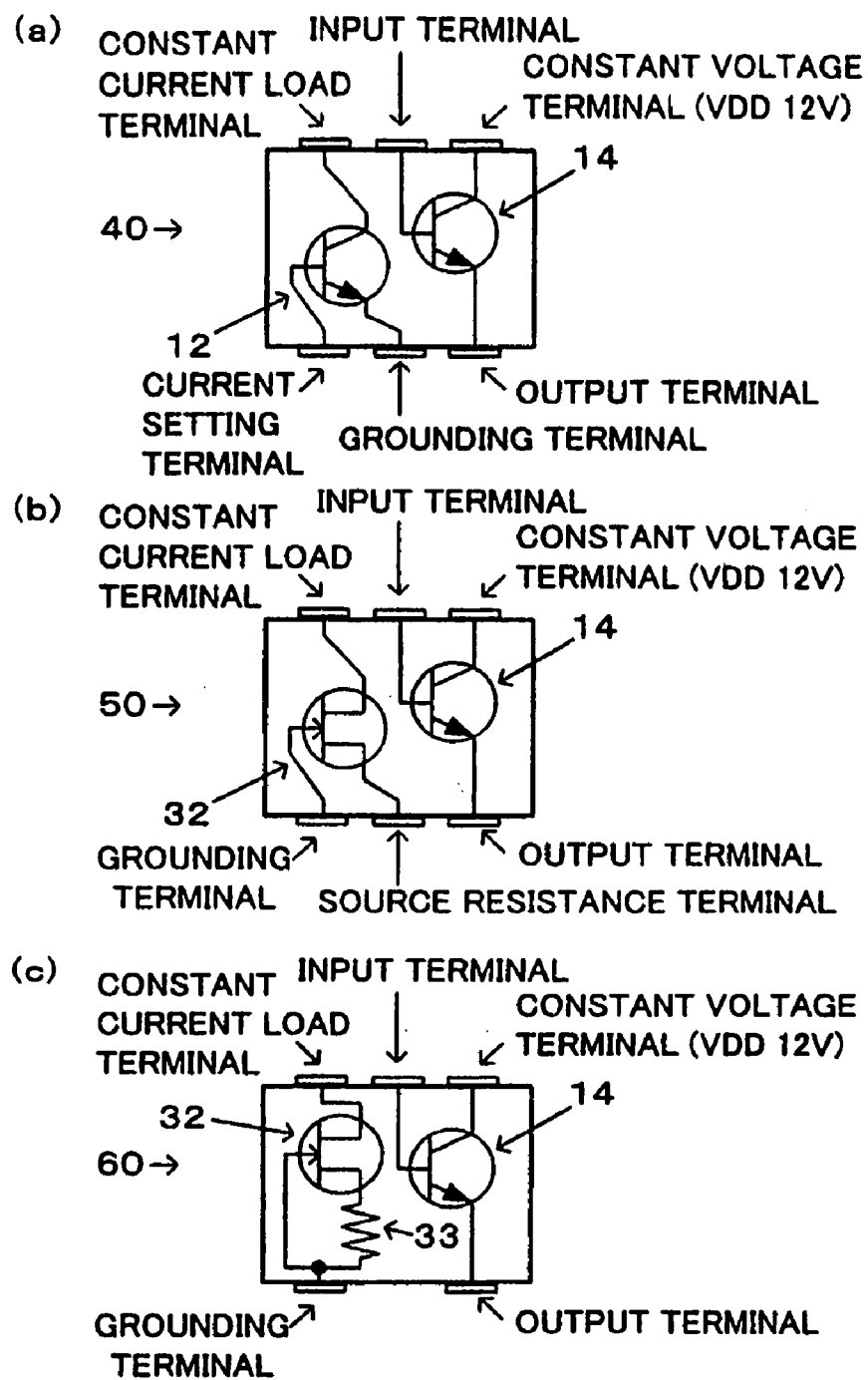
FIGS. 7A, 7B, and 7C each schematically illustrate the output device in a modified example 1.

The output device 40 shown in FIG. 7A is constituted by the common emitter transistor 12 and buffer transistor 14.

The output device 50 shown in FIG. 7B is constituted by the J-FET 32 and buffer transistor 14.

The output device 60 shown in FIG. 7C is constituted by the J-FET 32, source resistance 33, and buffer transistor 14.

MODIFIED EXAMPLE 2

[Outline]

In a modified example 2 of the present invention, not only at least the active elements in the current source circuit and final buffer circuit are included in the single package like the first to third embodiments and modified example 1, a semiconductor substrate constituting the solid-state image sensor is included in the same package.

Note that the current source circuit and final buffer circuit are not formed on the semiconductor substrate of the solid-state image sensor.

[Structure]

The following describes the modified example 2 of the present invention, where at least the parts of the current source circuit and final buffer circuit and the semiconductor substrate of the solid-state image sensor are included in the single package.

The modified example 2 corresponding to the first embodiment is such that a semiconductor substrate of the solid-state image sensor 1, a semiconductor substrate for the current source circuit 5, and a semiconductor substrate for the final buffer circuit 6 are formed in the single package.

The modified example 2 corresponding to the second embodiment is such that the semiconductor substrate of the solid-state image sensor 1, a semiconductor substrate for the current source circuit 21, and the semiconductor substrate for the final buffer circuit 6 are formed in the single package.

The modified example 2 corresponding to the third embodiment is such that the semiconductor substrate of the solid-state image sensor 1, a semiconductor substrate for the current source circuit 31, and the semiconductor substrate for the final buffer circuit 6 are formed in the single package.

The modified example 2 corresponding to the modified example 1 is such that the semiconductor substrate of the solid-state image sensor 1, and the main part of the current source circuit and buffer circuit are formed in the single package, and the remainder of the current source circuit and buffer circuit are formed on the printed-circuit board external to the package.

Note that the semiconductor substrate of the solid-state image sensor 1 and the remaining components in the package may be connected within the package by wire bonding using wires of gold or aluminum.

Figure 8:
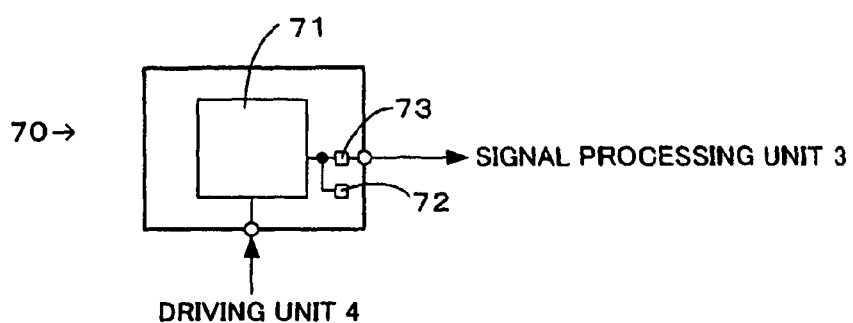
FIGS. 8A, 8B, and 8C each schematically illustrate the output device in a modified example 2.
Figure 8:
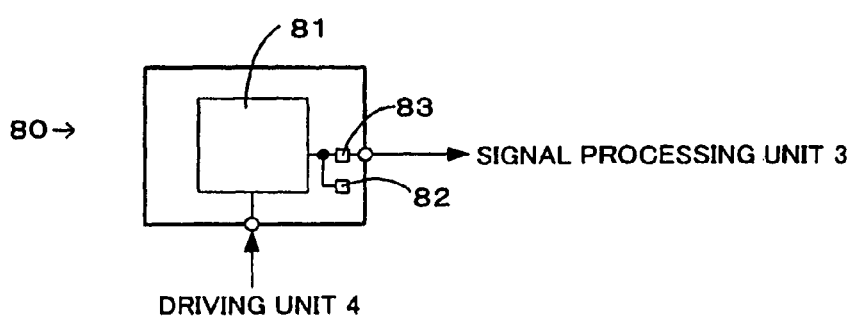
Figure 8:
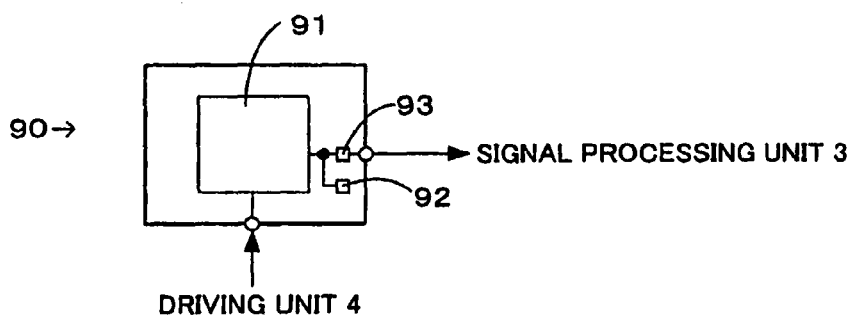

FIGS. 8A, 8B, and 8C each schematically illustrate the output device in the modified example 2 of the present invention. The same reference numbers are assigned to the components that are included in the first to third embodiments and the modified example 1, and these components are not explained here.

An output device 70 shown in FIG. 8A is constituted by a semiconductor substrate 71 of the solid-state image sensor 1, a semiconductor substrate 72 for the current source circuit 5 including at least the common emitter transistor 12, and a semiconductor substrate 73 for the final buffer circuit 6 including at least the buffer transistor 14.

An output device 80 shown in FIG. 8B is constituted by the semiconductor substrate 71 of the solid-state image sensor 1, the semiconductor substrate 72 for the current source circuit 21 including at least the common emitter transistor 12, and the semiconductor substrate 73 for the final buffer circuit 6 including at least the buffer transistor 14.

An output device 90 shown in FIG. 8C is constituted by a semiconductor substrate 81 of the solid-state image sensor 1, a semiconductor substrate 82 for the current source circuit 31 including at least the J-FET 32, and a semiconductor substrate 83 for the final buffer circuit 6 including at least the buffer transistor 14.

Although the NPN transistor is used for the final buffer circuit 6 in the above embodiments and modified examples, a PNP transistor may also be used instead. In general, output responsiveness of a DDC depends largely on a rising response characteristic, and accordingly it is possible to improve a falling slew rate without increasing an emitter current more than necessary by employing the PNP transistor for the final buffer circuit 6. Therefore, in terms of the response characteristic, it is advantageous to employ the PNP transistor for the final buffer circuit 6 when the final buffer circuit 6 is the output unit of the CCD.

Further, a base resistance of about 100Ω may be inserted to the buffer transistor 14 of the final buffer circuit 6. By inserting such a base resistance, it is possible to suppress problems such as an overshoot, an undershoot, and an oscillation, caused when driving the output signal of the CCD at a high speed.

Moreover, although the application of the present invention to the output unit in the CCD are explained as examples in the above embodiments and modified examples, the present invention may also be applied to MOS sensors such as CMOS sensors when including similar output states to those in the output unit of the CCD.

INDUSTRIAL APPLICABILITY

The present invention may be applied to imaging device such as home video cameras and digital still cameras. The present invention provides a solid-state image sensor that is capable of suppressing deterioration of image qualities due to a rise in temperature only at a part of photodetectors in vicinity of an output unit when a wafer of the solid-state image sensor is thin, in addition to deterioration of a S/N ratio caused by floating capacitance in the output unit external to the solid-state image sensor, and thus improves performance, such as image qualities, of the imaging devices.

Moreover, the application of the present invention is not limited to home devices, and the present invention may be applied to any kind of imaging devices.

What is claimed is:

1. An imaging apparatus having a solid-state image sensor in which a plurality of photodetectors are arranged, one or more output circuits in series and a buffer circuit, and processing luminance signals from the photodetectors to output image information, the buffer circuit performing impedance conversion on signals outputted from a final output circuit of the one or more output circuits, the final output circuit being a source follower circuit that has an active element and a current source which is inserted between a source terminal of the active element and a reference voltage terminal, wherein
   the current source and the buffer circuit are external to a first semiconductor substrate on which the photodetectors are formed,
   a main part of the current source and a main part of the buffer circuit are in a single package, and
   a thickness of the first semiconductor substrate is less than 500 μm.

2. A imaging apparatus according to claim 1, wherein the thickness of the first semiconductor substrate is less than 400 μm.

3. An imaging apparatus according to claim 1, wherein the main part of the current source is constituted by a first active element, and the main part of the buffer circuit is constituted by a second active element.

4. An imaging apparatus according to claim 3, wherein the first and second active elements are formed on a second semiconductor substrate that is different from the first semiconductor substrate, the second semiconductor substrate being included in the package.

5. An imaging apparatus according to claim 4, wherein the first semiconductor substrate and the second semiconductor substrate are connected to each other within the package.

6. An imaging apparatus according to claim 3, wherein the second active element is an element that improves a falling slew rate of the signals outputted from the final output circuit.

7. A imaging apparatus according to claim 6, wherein the second active element is constituted by a PNP transistor.

8. An imaging apparatus according to claim 3, wherein the second active element is constituted by a PNP transistor.

9. An imaging apparatus according to claim 3, wherein the current source includes an NPN transistor.

10. An imaging apparatus according to claim 3, wherein the current source includes a junction field-effect transistor.

\* \* \* \* \*